US012292540B2

(12) United States Patent
Nguyen et al.

(10) Patent No.: US 12,292,540 B2
(45) Date of Patent: May 6, 2025

(54) METHOD AND SYSTEM FOR DETECTING AN OBJECT IN A BOREHOLE (71) Applicant: Schlumberger Technology Corporation, Sugar Land, TX (US)

(72) Inventors: Thanh Nhan Nguyen, Clamart (FR); Kristina Prokopetc, Clamart (FR); Thomas Barrou, Clamart (FR); Janio Cornelio, Rio de Janeiro (BR); Josselin Kherroubi, Clamart (FR); Kamaljeet Singh, Bucharest (RO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/715,894

(22) PCT Filed: Apr. 7, 2023

(86) PCT No.: PCT/US2023/017880
§ 371 (c)(1),
(2) Date: Jun. 3, 2024

(87) PCT Pub. No.: WO2023/196591
PCT Pub. Date: Oct. 12, 2023

(65) Prior Publication Data
US 2024/0418895 A1 Dec. 19, 2024

Related U.S. Application Data (60) Provisional application No. 63/362,606, filed on Apr. 7, 2022.

(51) Int. Cl.
*G01V 1/50* (2006.01)
*E21B 47/002* (2012.01)
*E21B 47/095* (2012.01)

(52) U.S. Cl.
CPC ............ *G01V 1/50* (2013.01); *E21B 47/0025* (2020.05); *E21B 47/095* (2020.05); *G01V 2210/74* (2013.01)

(58) Field of Classification Search
CPC .. G01V 1/50; G01V 2210/74; E21B 47/0025; E21B 47/095
See application file for complete search history.

(56) References Cited

U.S. PATENT DOCUMENTS 5,502,686 A * 3/1996 Dory ...................... G01V 11/00
73/152.16
5,859,811 A * 1/1999 Miller ...................... G01V 1/48
367/25

(Continued)

FOREIGN PATENT DOCUMENTS

| CN | 103649781 B | * | 4/2017 | .......... E21B 49/006 |
| CN | 206246116 U | * | 6/2017 | |
| WO | 2018080450 A1 | | 5/2018 | |

OTHER PUBLICATIONS

Morris et al. "Application of Enhanced Ultrasonic Measurements for Cement and Casing Evaluation" (Year: 2007).*

(Continued)

*Primary Examiner* — Eyob Hagos
(74) *Attorney, Agent, or Firm* — Jeffrey D. Frantz (57) ABSTRACT A method for detecting an object in a borehole includes acquiring at least two ultrasonic logs of a borehole section. Each of the ultrasonic logs includes ultrasonic measurements taken at a plurality of tool azimuths of a plurality of depths including a target depth. The method also includes inferring a VDL image relative to the target depth for each of the ultrasonic logs. Further, the method includes aligning the VDL images. Further still, the method includes merging the aligned VDL images into a high-resolution VDL image.

(Continued)

Even further, the method includes detecting an object present in the borehole based on the high-resolution VDL image.

20 Claims, 9 Drawing Sheets

(56) References Cited

U.S. PATENT DOCUMENTS

| | | | | |
|---|---|---|---|---|
| 5,996,711 | A * | 12/1999 | Ohmer | E21B 29/06 166/255.2 |
| 7,272,504 | B2 * | 9/2007 | Akimov | E21B 47/12 702/9 |
| 7,522,471 | B2 | 4/2009 | Froelich | |
| 7,559,358 | B2 * | 7/2009 | DiFoggio | G01V 1/145 166/66.6 |
| 7,975,541 | B2 * | 7/2011 | Large | E21B 17/1021 166/241.5 |
| 2013/0308877 | A1 * | 11/2013 | Tezuka | G06T 3/4007 382/300 |
| 2014/0354855 | A1 * | 12/2014 | Venkataraman | H04N 13/243 348/239 |
| 2016/0053608 | A1 * | 2/2016 | Dowla | E21B 47/12 166/254.2 |
| 2017/0090057 | A1 * | 3/2017 | Thierry | E21B 47/005 |
| 2017/0192117 | A1 * | 7/2017 | D'Angelo | G01V 1/303 |
| 2017/0212274 | A1 * | 7/2017 | Sun | G01V 1/48 |
| 2019/0018161 | A1 * | 1/2019 | Wang | G01V 1/46 |
| 2019/0086571 | A1 | 3/2019 | Walker | |
| 2021/0032973 | A1 * | 2/2021 | Gkortsas | G01V 1/50 |
| 2021/0180442 | A1 | 6/2021 | Perrin | |
| 2021/0189858 | A1 | 6/2021 | Donderici | |
| 2021/0208299 | A1 * | 7/2021 | Wang | G01V 1/50 |
| 2021/0396900 | A1 * | 12/2021 | Wang | E21B 49/00 |
| 2022/0074299 | A1 * | 3/2022 | Li | E21B 47/005 |
| 2022/0229202 | A1 * | 7/2022 | Sun | G01V 1/50 |

OTHER PUBLICATIONS

Search Report and Written Opinion of International Patent Application No. PCT/US2023/017880 dated Jul. 25, 2023, 6 pages.
Bullock, R., "Least-Squares Circle Fit", retrieved from the internet on May 23, 2024 at [https://dtcenter.org/sites/default/files/community-code/met/docs/write-ups/circle_fit.pdf], dated Feb. 17, 2017, 3 pages.
Guizar-Sicairos, M. et al., "Efficient subpixel image registration algorithms", Optics Letters, 2008,(33), pp. 156-158.
Marple, S., "Computing the Discrete-Time "Analytic" Signal via FFT", IEEE Transactions on Signal Processing, 1999, 47(9), pp. 2600-2603.
Tang, J. et al., "Cement bond quality evaluation based on acoustic variable density logging", Petroleum Exploration and Development, 2016, 43(3), pp. 514-521.

* cited by examiner

METHOD AND SYSTEM FOR DETECTING AN OBJECT IN A BOREHOLE

CROSS-REFERENCE TO RELATED APPLICATION

This application is a National Stage Entry of International Application No. PCT/US2023/017880, filed Apr. 7, 2023, which claims priority to and the benefit of U.S. Provisional Application No. 63/362,606, entitled "Method and System for Detecting an Object in a Borehole," filed Apr. 7, 2022, which is hereby incorporated by reference in its entirety for all purposes.

BACKGROUND

The present disclosure generally relates to techniques for detection of objects in a borehole. More specifically, the present disclosure relates to techniques for detecting an object in a borehole using waveforms acquired based on an ultrasonic measurement.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Drilling equipment Different tools are used for well integrity analysis. Specifically, ultrasonic imager tools including pulse-echo and/or flexural measurements are used to scan the casing condition, material in the annulus (volume between the outer surface of inner casing/tubing and outer casing or formation), and cement bond around the entire casing circumference and measure the internal and external casing interfaces.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a method for detecting an object in a borehole. The method includes acquiring at least two ultrasonic logs of a borehole section. Each of the ultrasonic logs includes ultrasonic measurements taken at a plurality of tool azimuths of a plurality of depths including a target depth. The method also includes inferring a VDL image relative to the target depth for each of the ultrasonic logs. Further, the method includes aligning the VDL images. Further still, the method includes merging the aligned VDL images into a high-resolution VDL image. Even further, the method includes detecting an object present in the borehole based on the high-resolution VDL image.

Certain embodiments of the present disclosure include a method for building a high-resolution VDL image from two low-resolution images relative to a target depth of a borehole. The two low-resolution images are obtained using ultrasonic measurements. The method includes aligning the two low-resolution images in time and azimuth and merging the two aligned low-resolution images using interpolation techniques. Aligning the two low-resolution images includes pre-aligning two low-resolution images using an additional measurement taken during acquisition of the ultrasonic measurements. The additional measurement relates to relative bearing. Further, the method includes computing a relative offset between the pre-aligned low-resolution images using a phase-cross-correlation method. Further still, the method includes using the relative offset to warp one of the low-resolution images into the coordinate system of the other low-resolution image.

Certain embodiments of the present disclosure include a method for building a high-resolution VDL image from two low-resolution VDL images relative to a target depth of a borehole obtained using ultrasonic measurements. The method includes aligning the two low-resolution images in time and azimuth and merging the two aligned low-resolution images using interpolation techniques. Aligning the two low-resolution images includes, for each of the low-resolution images, localizing measured tubing points using at least the ultrasonic measurements and a relative bearing measurement taken during ultrasonic measurements acquisition. Further, the method includes, based on the tubing point localization, estimating the tubing center. Further still, the method includes converting each of the two low-resolution images into a reference coordinate system defined based on the tubing center and a vertical axis.

Certain embodiments of the present disclosure include a system for detecting an object in a borehole. The system includes a processing system that receives at least two ultrasonic logs of a borehole section. Each of the ultrasonic logs comprises ultrasonic measurements taken at a plurality of tool azimuths of a plurality of depths including a target depth. The processing system also infers a VDL image relative to the target depth for each of the ultrasonic logs. Further, the processing system aligns the VDL images. Even further, the processing system merges the aligned VDL images into a high-resolution VDL image. Further still, the processing system detects an object present in the borehole based on the high-resolution VDL image.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which.

DETAILED DESCRIPTION

One or more specific embodiments of the present disclosure will be described herein. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "up" and "down," "uphole" and "downhole", "upper" and "lower," "top" and "bottom," "above" and "below," and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequently, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention).

In the present context, the term "about" or "approximately" is intended to mean that the values indicated are not exact and the actual value may vary from those indicated in a manner that does not materially alter the operation concerned. For example, the term "about" or "approximately" as used herein is intended to convey a suitable value that is within a particular tolerance (e.g., ±10%, ±5%, ±1%, ±0.5%), as would be understood by one skilled in the art.

Figure 1:
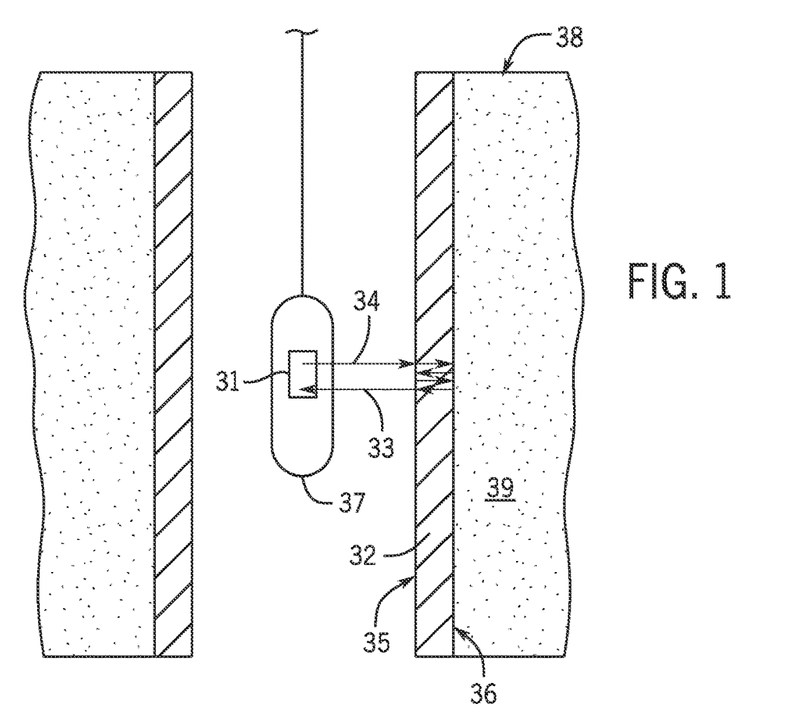
FIG. 1 shows a schematic view of a logging tool with a transducer that may be used to obtain pulse-echo measurements, in accordance with embodiments of the present disclosure.

To facilitate the discussion herein, FIG. 1 shows a schematic view of a logging tool (e.g., downhole tool) with a transducer that may be used to obtain pulse-echo measurements, in accordance with embodiments of the present disclosure. As illustrated in FIG. 1, the pulse-echo measurements in well integrity application are obtained with a single transducer 31 mounted on a logging tool 37, that insonifies the casing 32 at near-normal incidence, and receives reflected ultrasonic waveform (i.e., echoes) 33. The transducer 31 insonifies the casing 32 with an acoustic wave 34 having a frequency selected to stimulate a selected radial segment of the casing 32 into a thickness resonance. A portion of the acoustic wave is transferred into the casing and reverberates between a first interface 35 and a second interface 36. The first interface 35 exists at the juncture of a borehole fluid in a casing 32 and the casing 32. The second interface 36 is formed between the casing 32 and the annulus 38 behind the casing 32. A further portion of the acoustic wave is lost in the annulus 38 at each reflection at the second interface 36, resulting in a loss of energy for the acoustic wave. The acoustic wave loses more or less energy depending on the state of the matter 39 behind the casing 32. In standard well integrity applications, such measurements enable to give indication on casing internal diameter, external diameter, thickness and acoustic impedance of the material in the annulus.

Figure 2:
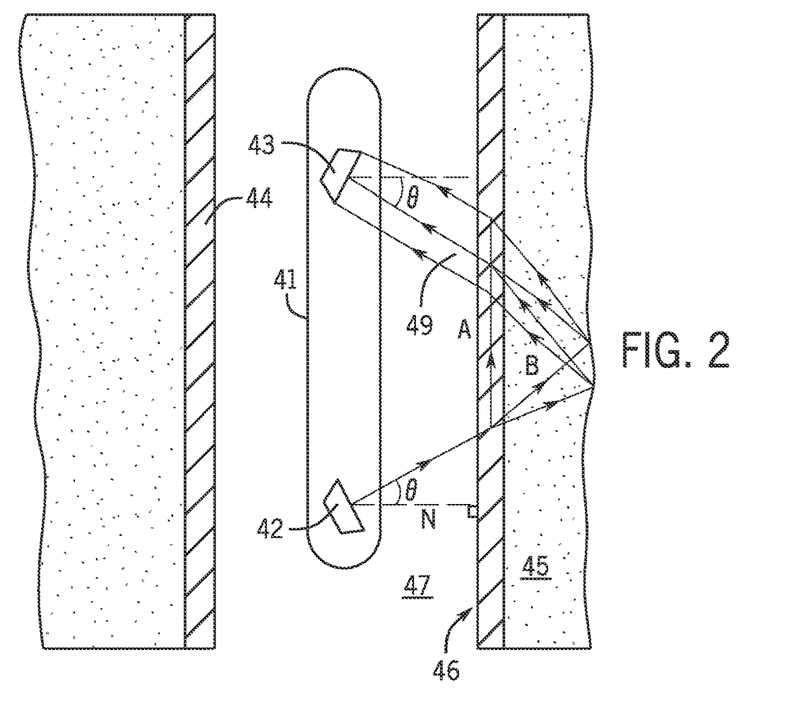
FIG. 2 shows a schematic view of a logging tool with a transducer that may be used to obtain flexural measurements, in accordance with embodiments of the present disclosure.

FIG. 2 shows a schematic view of a logging tool with a transducer that may be used to obtain flexural measurements. As shown on FIG. 2, the flexural measurements in well integrity application are obtained with a logging tool 41 including an acoustic transducer for transmitting 42 and at least an acoustic transducer for receiving 43 mounted therein. The transducer for transmitting 42 and the transducer for receiving 43 are aligned at an angle θ. The angle θ is measured with respect to the normal to the local interior wall of the casing N. The angle θ is larger than a shear wave critical angle of a first interface 46 between a casing 44 and a fluid 47, e.g., oil or gas, therein. Hence, the transducer for transmitting 42 excites a flexural wave A in the casing 44 by insonifying the casing 44 with an excitation aligned at the angle θ greater than the shear wave critical angle of the first interface 46.

The flexural wave A propagates inside the casing 44 and sheds energy to the fluid 47 inside the casing 44 and to the fill-material 45 behind the casing 44. A portion B of the flexural wave propagates within an annulus and may be refracted backward at a third interface in order to gather information on the annulus. An echo 49 (received ultrasonic waveform) is recorded by the transducer for receiving 43.

Such flexural measurement may be taken with one receiver or two receivers, such as near and far receivers. In conventional techniques, some ultrasonic logging tool perform the pulse-echo measurement and an additional flexural measurement. The flexural measurements are generally performed at a plurality of depths and azimuths in the wellbore as the tool is rotating and also moving up and down the borehole while acquiring the ultrasonic measurements.

Detecting an object in a borehole, and in particular in an annulus, or described herein a control line, has been attempted by using conventional techniques based on ultrasonic measurements, in particular flexural measurements. Such detection relies on the visual analysis of the flexural waveforms, where an interpretation engineer manually scans through the ultrasonic log, locates the control line signature and infers a corresponding angular measurement. A very similar logic can be applied to various other object detection tasks. The accuracy and precision of the detection is constrained by the azimuthal resolution of the acquired data. In the case of ultrasonic flexural waveforms from known tool, the measurements are captured approximately every 10 degrees. Thus, there exists an uncertainty of the visual pattern representing the object of interest to be absent on the acquired data leading to missed and/or imprecise detection.

Accordingly, the present disclosure is directed to improved techniques for identifying objects (e.g., tools, downhole devices, control lines, flatpacks, and so on) in a borehole using variable-density log (VDL) images. In some embodiments, the disclosed techniques utilize waveforms acquired as part of an ultrasonic measurement, to detect an object in the borehole, such as an object within the casing of a borehole or in the annulus (e.g., an object situated between the casing and a geological formation, such as the control lines in the annulus). In some embodiments, the ultrasonic measurement may include a pulse-echo measurement, a flexural measurement, or both. Such control lines enable safety and standard compliance before well sealing and abandoning. In some embodiments, the disclosed techniques leverage VDL images by mapping the received ultrasonic waveform intensity as a function of time and a tool azimuth (e.g., in time and in azimuth) at a target depth. In some embodiments, mapping the received ultrasonic waveform intensity as a function of time and a tool azimuth at a target depth may be built using the ultrasonic measurement, to detect such objects. The VDL image may be a representation of all waveforms acquired at different azimuths of the target depth as a function of time and azimuth. For example, the techniques may include using multiple ultrasonic log acquisitions (e.g., runs, passes) of the same borehole section and digitally increase the angular resolution of the acquired data. Because two different passes most likely will not capture the exact same portion of the well, they, therefore, will provide complementary information that can be combined to aid the accuracy and precision of the object detection. To facilitate detection of the object, the techniques may include formulating a multi-frame super-resolution task. For example, it may be advantageous to align the ultrasonic logs obtained at the two passes and having a standard azimuthal resolution (e.g., defined by the acquisition setting and/or hardware) and construct a new high-resolution representation. Applied to the borehole object detection problem, each measurement will cover less than 10 degrees. Aligning the images may be done using several methods. Two example methods are present herein, each of which may be automated to swap one-the-fly automatically or follow a human-in-the-loop settings and let the user to choose. As such, the disclosed techniques provide a unique solution that can drastically improve the detection of object within the borehole, and can be used as a pre-processing step in the full automation of any object detection (and specifically the control line detection). Furthermore, the solution presented here may apply to most imager measurements (maps) when aiming at improving resolution above the native resolution given by the hardware of the tool to aid various image interpretation tasks.

Figure 3:
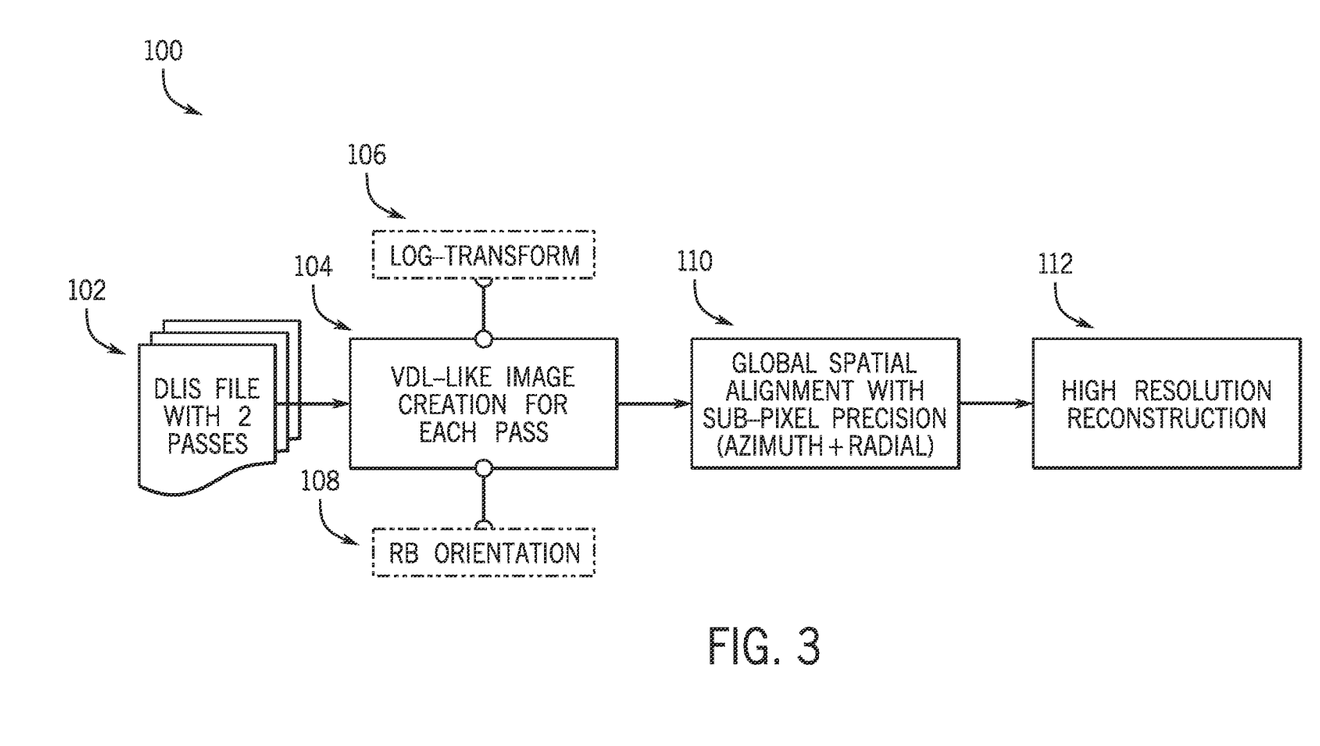
FIG. 3 is a flow diagram illustrating a process for detecting an object present in a borehole based on a variable-density log (VDL) image, in accordance with embodiments of the present disclosure.

FIG. 3 is a flow diagram illustrating a process 100 for detecting an object present in a borehole based on a VDL image, in accordance with embodiments of the present disclosure. In some embodiments, the process 100 may be performed the one or more processors of the processing system 352, as described in FIG. 12. In general, the method includes acquiring at least two ultrasonic logs of a borehole section. In some embodiments, each of the ultrasonic logs includes ultrasonic measurements taken at a plurality of tool azimuths of a plurality of depths including a target depth. In some embodiments, the method also includes inferring a VDL image relative to the target depth for each of the ultrasonic logs. In some embodiments, the method includes aligning the VDL images. In some embodiments, the method includes merging the aligned VDL images into a high-resolution VDL image. In some embodiments, the method includes detecting an object present in the borehole based on the high-resolution VDL image.

A non-limiting example of the process 100 described above is shown in FIG. 3. The process 100 begins with receiving, obtaining, or otherwise acquiring well log data (e.g., digital log information standard (DLIS) files) with multiple passes (e.g., 2 passes, 3 passes, 4 passes, 5 passes, or more than 5 passes), as shown in block 102. As described above, the well log data may include at least two ultrasonic logs of a borehole section.

Acquisition of Ultrasonic Logs

As indicated above ultrasonic logs are acquired by running an ultrasonic well-known tool into the borehole. The ultrasonic logs may be acquired using the same tool at two different times (for instance, logging down and then logging up) or different tools performing the same measurement. The ultrasonic logs are acquired as a function of depth and azimuth. They comprise several measurements taken at a plurality of tool azimuths (for instance, as indicated above, every 10°) of a plurality of depths including a target depth.

In some embodiment, the ultrasonic measurement is a pulse-echo measurement. In some other embodiment, the ultrasonic measurement is a flexural measurement. Flexural measurement may be used preferably to detect objects in the annulus due as the flexural measurement is better for directly probing reflection/echoes occurring in the annulus.

In general, obtaining, acquiring, or measuring ultrasonic measurements may include firing an ultrasonic signal and receiving an ultrasonic waveform corresponding to the interaction of the ultrasonic signal with the borehole environment. The ultrasonic waveform includes one or more echo corresponding to reflection of the ultrasonic signal onto the one or more interfaces of the borehole (e.g., inner surface of the casing, outer surface of the casing, formation wall). The received waveforms are recorded in time starting at the time at which the ultrasonic signal has been emitted.

The process 100 may include creating, generating, inferring, or determining a VDL image (e.g., a VDL-like image) relative to the target depth for each of the ultrasonic logs, as shown in block 104. In some embodiments, the process 100 may include receiving an image transformation, such as a log-transformation 106, which may improve or enhance the appearance of local texture of the VDL image. In some embodiments, the process 100 may include generating VDL image using an additional measurement relative to the tool orientation, such as a received relative bearing (RB) orientation 108 (e.g., relative bearing). In some embodiments, the additional measurement may be measured during ultrasonic measurement acquisition. Further, the process 100 may include aligning the VDL image, at block 110, such as performing global spatial aligning with sub-pixel precision (e.g., using azimuth and radial information). Further still, the process 100 may include generating a high-resolution image (e.g., high resolution reconstruction), at block 112.

To facilitate the discussion of the disclosed techniques, additional details of the process 100 are described below. First, additional details with regards to creating, generating, inferring, or determining the VDL image (e.g., block 104) are described below.

Inferring a VDL Image

Figure 4:
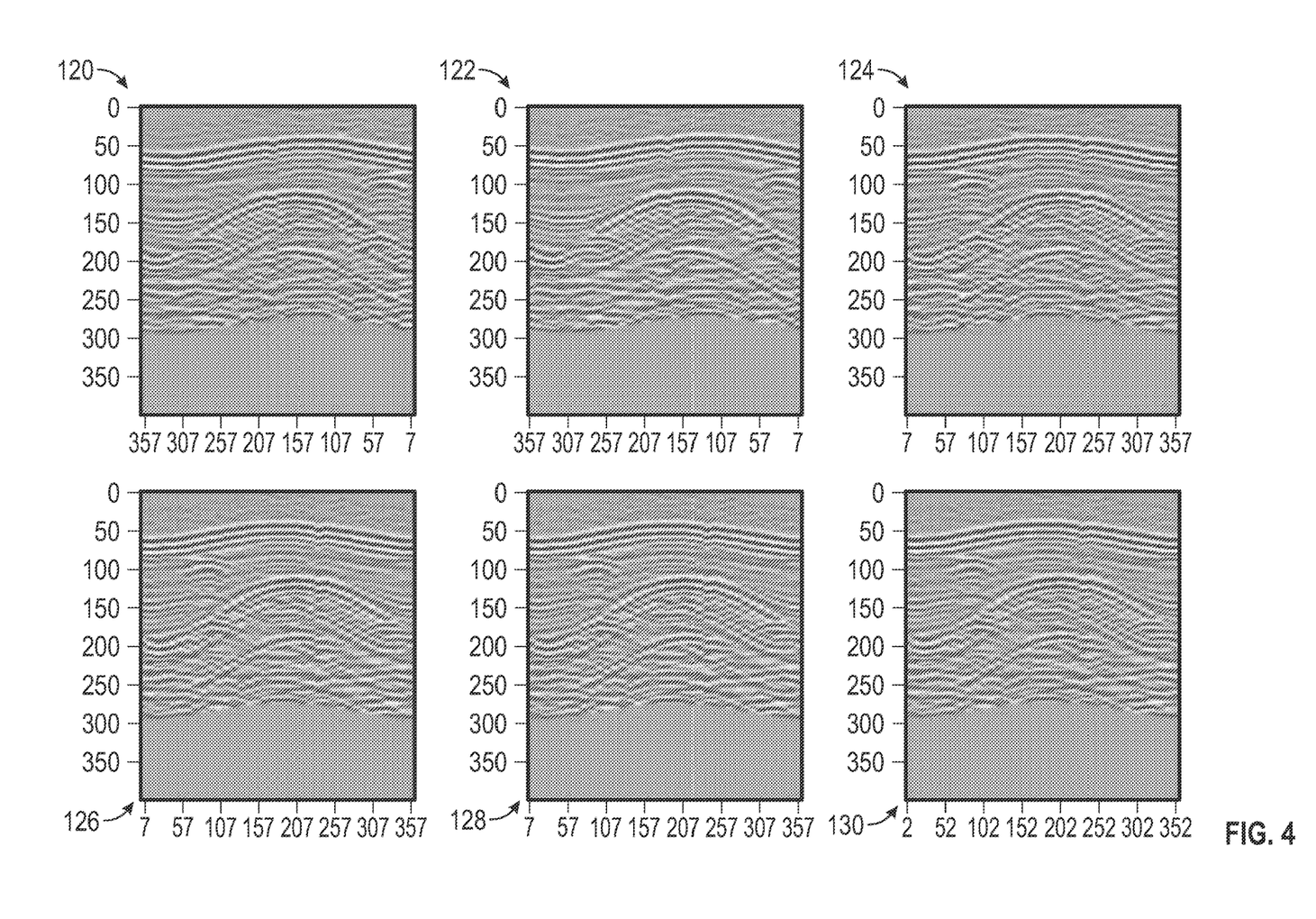
FIG. 4 shows examples of VDL images, in accordance with embodiments of the present disclosure.

To emulate the data representation as close as possible to the one used by the interpretation engineer; the creation of VDL image is proposed. VDL or Variable Density Log is the common way to represent the raw waveforms as an image. To facilitate this discussion, FIG. 4 shows examples of pre-processed VDL images 120, 122, 124, 126, 128, and 130, in accordance with embodiments of the present disclosure. More specifically, image 120 is an original image (e.g., preprocessed image) acquired during a first pass, image 122 is an original image acquired during a second pass, image 124 is the RB-orientated image of image 120, image 126 is the RB-oriented image of image 122, and image 130 is the high-resolution or super resolution image result generated using the techniques described herein. In block 102 of FIG. 3, at least in some instances, all waveforms acquired with a transducer (e.g., in particular its intensities) are loaded and represented in 2D (e.g., one axis representing time and the second axis representing azimuth at which the waveform has been acquired). This involves stacking all waveforms from the same measured depth (i.e., target depth) in the azimuthal direction and optionally pre-processing the VDL image (e.g., at block 104 of FIG. 3). Such pre-processing may include the adjustment of the time of arrival using corresponding common time reference and an image transformation (e.g., log-transformation) to enhance the appearance of local texture. Thus, the dimensions of the image are determined by the azimuthal resolution of the acquisition and by the sampling of the ultrasonic waveforms.

The VDL image is computed for each of the first and second logs at a depth corresponding to the target depth. Images 120 and 122 of FIG. 4 show pre-processed VDL images for respectively the first and the second passes. The azimuth axis is shown in abscissa (i.e., x-axis) and is represented relative to a reference azimuth of the tool. However, as both tools may have had different positions in the borehole at the time of acquisition, the reference azimuth of the tool for the first log does not necessarily correspond to the reference azimuth of the tool for the second log. Similarly, as the eccentering of the tool during the first and second log is not the same, the waveforms measuring the same azimuth of the wellbore may be very different on first and second image as the distance between tool and borehole wall are not the same. The first and second images are computed relative to a target depth. That is, at least one measurement represented on the image is taken at the target depth. Additional details with respect to aligning a VDL image are described below.

Aligning One or More VDL Images

In some embodiments, a first and second VDL images are then aligned, at least relative to time and azimuth. In some embodiments, the alignment may be obtained using additional measurement taken in the borehole such as a relative bearing, which will be helpful in horizontal or deviated wells. Provided below are two different example methods for aligning the VDL images are disclosed.

First Alignment Method

In general, the first alignment method includes performing (i) radial shift correction and (ii) image registration with relative bearing (RB) offset correction and global azimuth shift estimation.

Radial Shift Correction

Original waveforms when combined may result in jittered appearance and may pose challenges for further processing steps. It is therefore important to correct this to facilitate the image alignment step. This can be performed by various methods as known by one of ordinary skill in the art. For example, this may be performed by computing for each waveform the position (e.g., corresponding to a reference time) of a common event. This may include selecting, for instance, the position of the echo (e.g., its maximum) of the flexural wave as the common event. For example, it is presently recognized that a maximum position of the echo may serve as a suitable representation of the common event. For example, when an ultra-sonic pulse is transmitted and contacts the inner surface of a casing or tubing, it reflects back towards the downhole tool. The point where the rising edge of the envelope of the echo starts should align with this event (e.g., the time period corresponding to the return of the reflected ultra-sonic pulse). Detecting this event may be challenging as it may be attributed to an artifact, such as a noise pulse. As such, it may be advantageous to use the maximum of the envelope or substantially near the maximum (e.g., approximately 80%, approximately 85%, approximately 90%, approximately 95%, approximately 99% of the maximum) for the common event.

Once computed, this value can be used as a reference position towards which all the columns of the image can be adjusted (each waveform is shifted in radial direction). This corresponds to aligning the first and second VDL images in time. Such alignment may not be needed in case this is already performed as the pre-processing stage and the delivered VDL image is already aligned in time.

Figure 11:
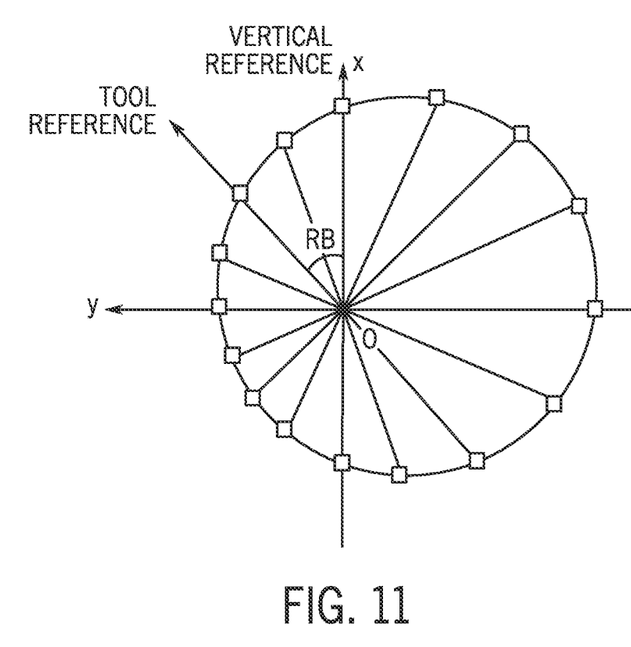
FIG. 11 shows an axis that may be used to compute azimuthal offset, in accordance with embodiments of the present disclosure.

Image Registration with Relative Bearing Offset Correction and Global Azimuth Shift Estimation The first alignment method includes two operations corresponding to aligning the first and second images in azimuth. Once first and second VDL images have been constructed for the target depth based on the data from the first and second passes, the method includes adaptive data alignment relative to azimuth. Such alignment relative to azimuth uses other measurement taken in the borehole, that are relative to an absolute angle, such as relative bearing (RB) orientation 108 as shown in FIG. 3. Relative bearing is the angle between a reference line of the tool and the vertical axis. Such measurement may be used to orient the image as a pre-alignment step. In other words, after such pre-alignment (e.g., thereby generating pre-aligned VDL images), the VDL image is represented relative to a reference azimuth of the well. The relative bearing may be used to identify a reference position of the tool in the borehole in view of its relative bearing. This may be used to orient each image with respect to the relative bearing and therefore minimize the global offset between first and second image.

This pre-alignment may include computing azimuthal offset for each pass by rotating the columns of each image so that they have a wellbore reference azimuth as azimuth origin. In an embodiment, this may include subtracting the corresponding value of the measured relative bearing at a given depth from full rotation angle (i.e., 360 degrees) to obtain a reference angle, rotating the image columns so that the column having the azimuth corresponding to the reference angle becomes the azimuth origin of the image, and reversing the order of the columns (e.g., reversal of the columns being an optional operation). For clarity's sake, this is explained in more details in relationship with FIG. 11.

After the pre-alignment, a relative offset between first and second pre-aligned images is computed. A global relative 2D translation is estimated between two images affected by independent noise using phase-cross-correlation method to align second image on first image. This technique may be performed using cross-correlation image registration by DFTs (Discrete Fourier Transformations). It is a common choice due to its resilience to noise, occlusions, and other defects typical of medical, satellite images and borehole images of the same modality. The estimate of the 2D offset is then used to warp (e.g., transform) the second image to the coordinate system of the first image. This ensures an adaptive approach because the relative bearing measurements may not always be reliable, especially in the case of vertical or close to vertical wells. At the output of this operation, first and second images are aligned. Image 128 of FIG. 4 shows the second image that has been aligned to the coordinate system of the first image. The high-resolution image obtained from the first and second aligned images of the first alignment method are shown in image 130.

Second Alignment Method

The second approach in this invention is proposed in the assumption that the information for each log is fully recorded including: (i) digital waveforms Ui of measuring azimuth i, and (ii) silent period Ti at the measuring azimuth i, in which received signal is discarded (e.g., the silent period may be used for ensuring that the receiver does not receive any probing signals from previous firing events), and (iii) relative angle Aj which records the angle between a well's referring direction and the referring direction of the ultrasonic tool at the pass j. In the example, the relative angle corresponds to Relative Bearing.

Figure 5:
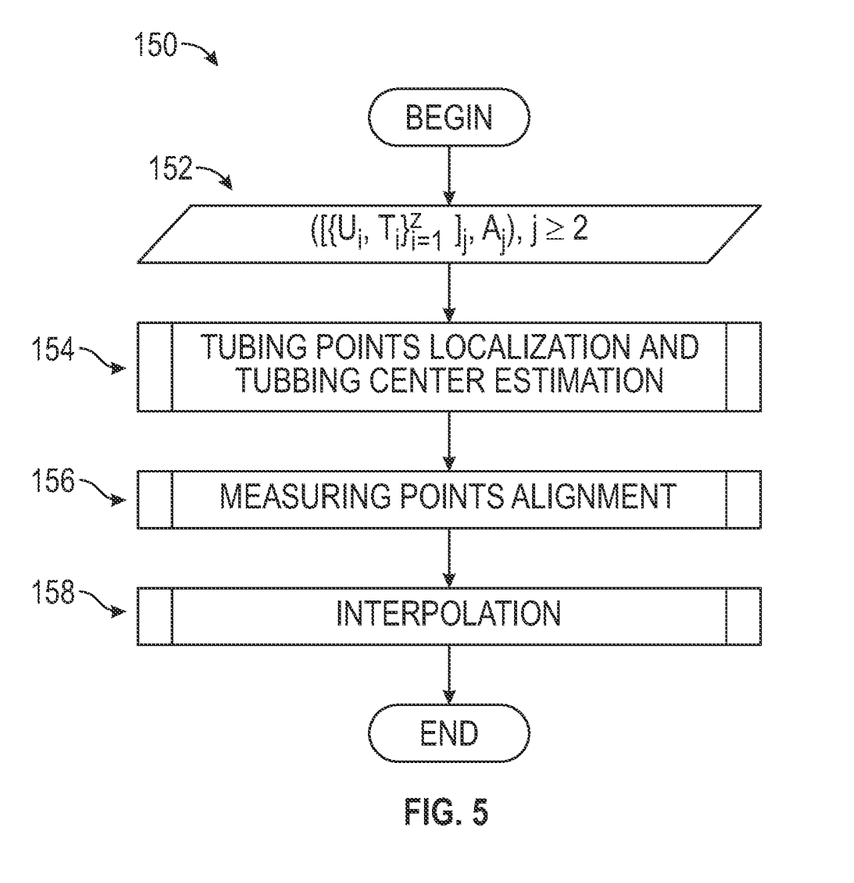
FIG. 5 is a flow diagram illustrating a process for aligning VDL images, in accordance with embodiments of the present disclosure.

This second method includes aligning all measured waveforms/points of different VDL images based on the geometrical positions of the tools in the borehole during first/second pass. To implement this alignment, all measured waveforms/points need to be localized in the same coordinate system. Given that at each depth cross-section, the innermost tube is a circle, and the tubing positions can be recognized as the first most attenuated peak of a measured waveform, the common coordinate system is then defined based on the center of the tubing. To align all measured waveforms to the common coordinate system, for each pass j, the algorithm performs the following steps (i) tubing points localization, (ii) tubing center estimation, and (iii) convert measuring points to the common coordinate system. FIG. 5 is a flow diagram illustrating a process 150 for aligning VDL images, in accordance with embodiments of the present disclosure. In some embodiments, the process 150 may be performed the one or more processors of the processing system 352, as described in FIG. 12. In general, the process 150 includes receiving aligned waveforms 152. The process 150 may include performing tubing point localization and tubing center estimation, at block 154. The process 150 may also include aligning or centering measuring points, at block 156. Further, the process 150 includes interpolation to convert measuring points to a common coordinate system, at block 158. After estimating the common coordinate system for each pass and then the alignment of all measuring points of all passes, the output can be an aligned waveform map for instance.

Tubing Point Localization

Figure 6:
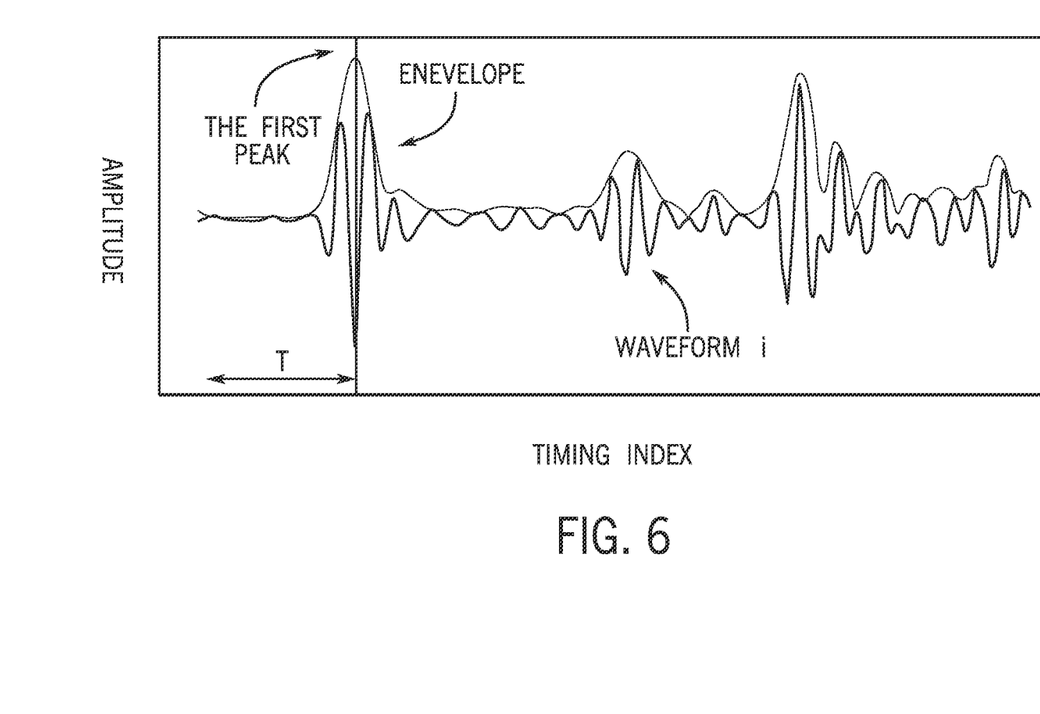
FIG. 6 shows an example of a waveform that may be used to localize one or more tube points, in accordance with embodiments of the present disclosure.
Figure 7:
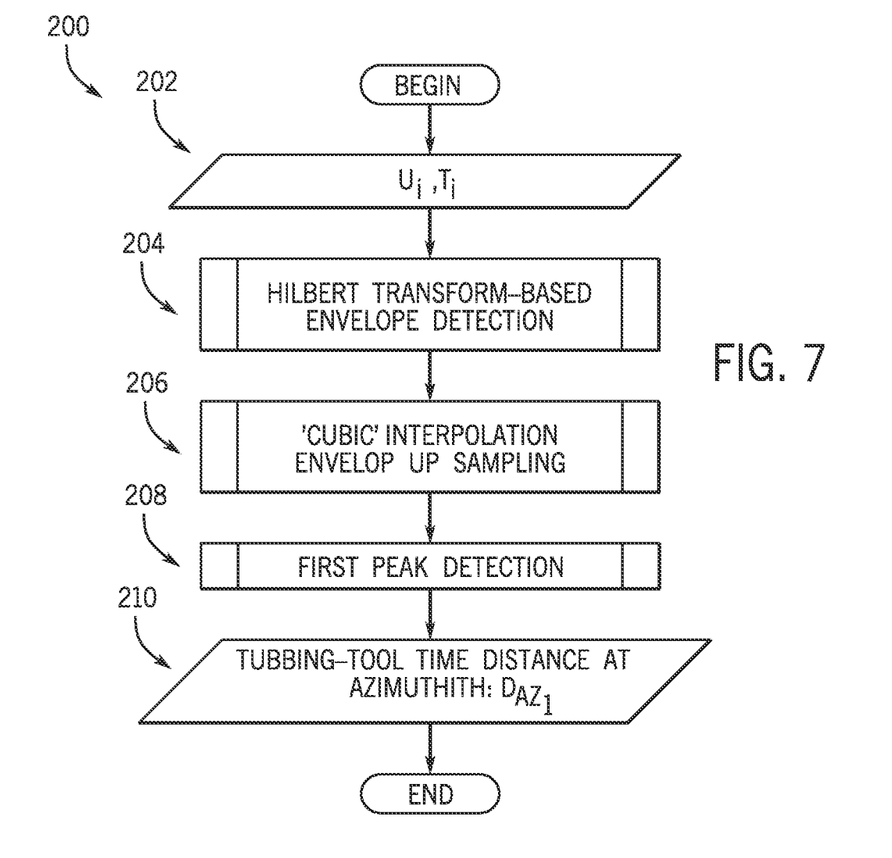
FIG. 7 is a flow diagram illustrating a process for localizing a tubing point, in accordance with embodiments of the present disclosure.
Figure 8:
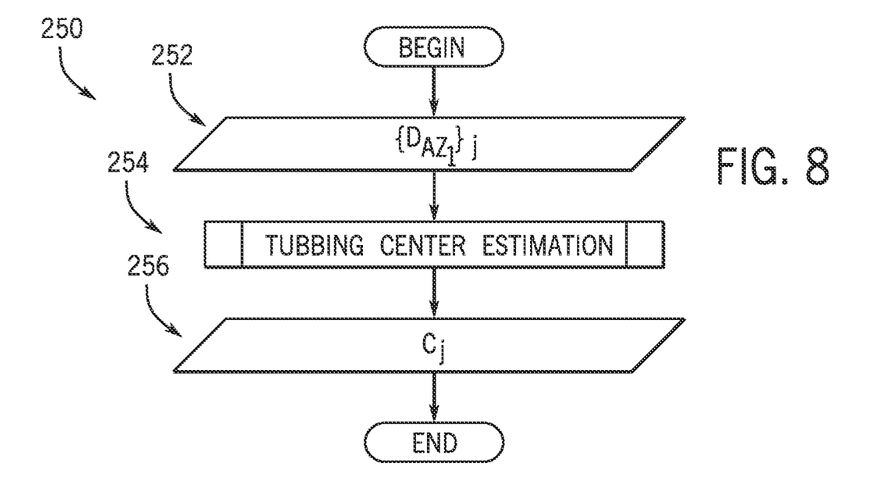
FIG. 8 is a flow diagram illustrating a process for estimating a tubing center, in accordance with embodiments of the present disclosure.

To facilitate the discussion of tubing point localization, FIGS. 6-8 illustrate waveforms and example processes. FIG. 6 shows an example of a waveform that may be used to localize one or more tube points, in accordance with embodiments of the present disclosure. FIG. 7 is a flow diagram illustrating a process 200 for localizing a tubing point, in accordance with embodiments of the present disclosure. In some embodiments, the process 200 may be performed the one or more processors of the processing system 352, as described in FIG. 12. In general, the process 200 includes receiving the digital waveforms, $U_j$, and Silent Period, $T_j$, at block 202. The process 200 also includes performing a Hilbert Transform-based envelop detection, at block 204. Further, the process 200 includes performing 'Cubic' interpolation envelop up sample, at block 206. Further still, the process 200 includes detecting a first peak, at block 208. In turn, the process 200 may include determining a tubing-tool time distance at azimuth, $D_{AZi}$, at block 210.

FIG. 8 is a flow diagram illustrating a process 250 for estimating a tubing center, in accordance with embodiments of the present disclosure. In some embodiments, the process 250 may be performed the one or more processors of the processing system 352, as described in FIG. 12. In general, the process 250 includes receiving $D_{AZi}$ (e.g., block 252). The process 250 also includes estimating a tubing center, at block 254. Further, the process 250 include generating as an output, the tubing center, $C_j$, at block 256. Additional details with respect to FIGS. 6-8 are described below.

As the material of the inner most tube causes the first strongest attenuation on the received signal, the first peak of the envelope of the measured waveform (e.g., recorded waveform) is supposed to correspond to the location of the well innermost tube. To localize the tubing points, a transform, such as Hilbert transform, may be used for extracting the envelope of the measuring waveform. The detected envelope is then up sampled with cubic interpolation for obtaining a more accurate location of tubing points. As noted above, FIG. 6 illustrates an example of a waveform, an envelope, and the first peak position. Further, FIG. 7 shows the process 200 for localizing a tubing point. The position of a tubing point determined from the tool location is defined by the azimuthal angle computed by 360(i−1)/Z degree (e.g., wherein Z is the azimuthal resolution) with respect to the referring direction of the tool, and a time distance given by $D_{AZi}=T_i+T_{Oi}$ (wherein $T_i$ is the silent period at the measuring azimuth i and $T_{Oi}$ is the time period between the first received sample to the first peak of the envelope of the measured waveform determined thanks to the Hilbert transform—shown in FIG. 6).

Tubing Center Estimation

For a measuring pass j, depending azimuthal resolution N, the tubing localization step provides a set of tubing points {DAZi, i=1, . . . , N}jDAZi, i=1, . . . , Nj. Given the assumption that the normal cross section of a tube is a circle, the center of that cross section can be estimated. Any other known approach for determining center of a circle based on set of points of the circle may be used. The process for tubing center estimation is shown in FIG. 8.

Converting the VDL Images into the Reference Coordinate System

As described above, the process 150 includes interpolation to convert measuring points to a common coordinate system, at block 158. For each pass, the location of measuring point will be converted to the same common coordinate system, which is defined by the following elements: (i) the origin is located at the center of the innermost tube, (ii) the referring direction is the well's vertical direction, and (iii) the azimuthal referring direction is the clockwise one. In some embodiments, the VDL image may be converted into a reference coordinate system defined using the tubing center and on a vertical axis.

Figure 9:
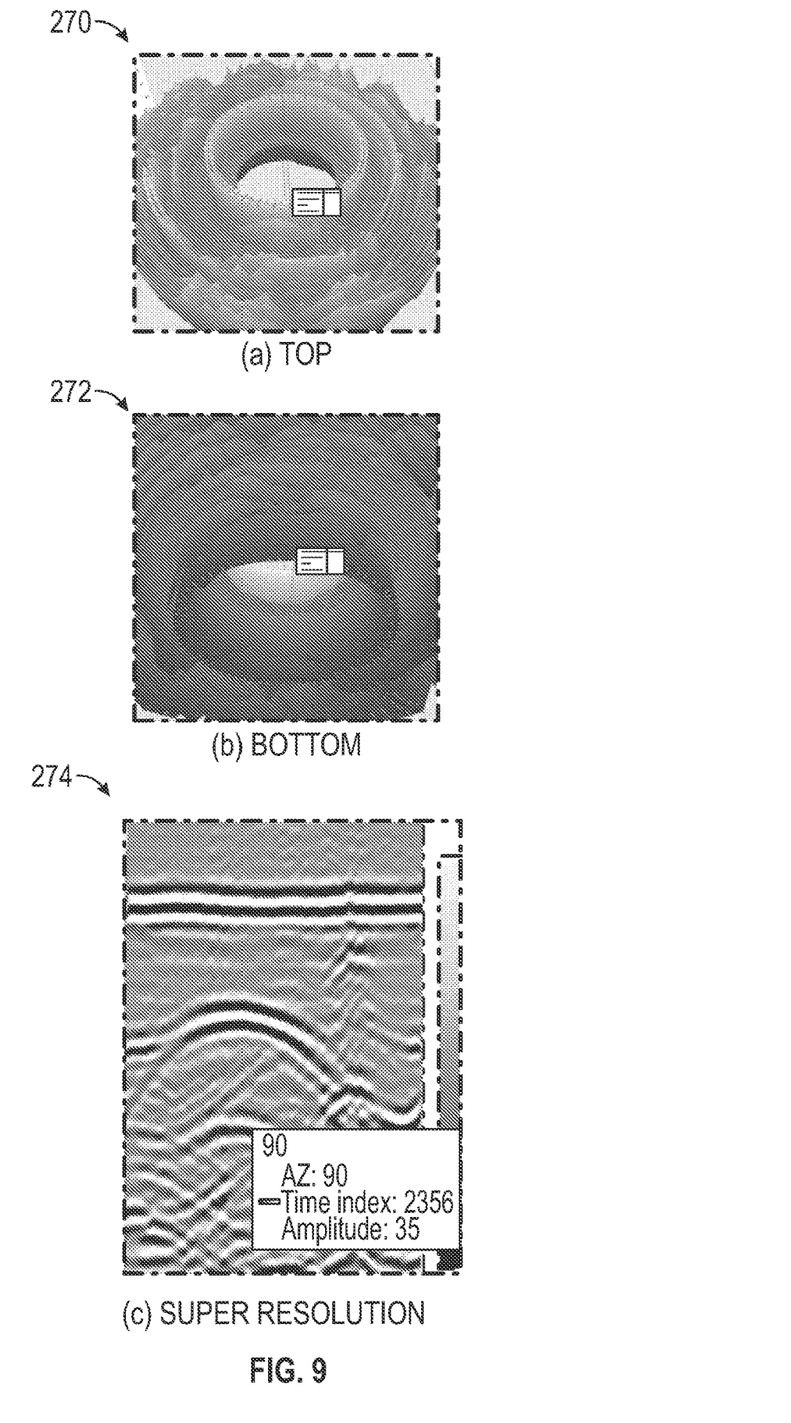
FIG. 9 is a diagram illustrating a process for merging measuring passes at a depth of a testing well, in accordance with embodiments of the present disclosure.

In this way, all the measuring points of different passes can be registered in the same coordinate system. The output at this step will be an aligned waveform map. FIG. 9 is a diagram illustrating merging measuring passes at a depth of a testing well, in accordance with embodiments of the present disclosure. In general, FIG. 9 shows a first aligned image 270, a second aligned image 272, and a merged image 274. The first aligned image 270 and the second aligned image 272 are images reconstructed in the same coordinate system. The values of all registered points defined above for each of the first and second images are written into a matrix the rows and columns of which are, respectively, defined as timing index and azimuthal angle of the common coordinate system. The two alignment methods presented above are exemplary methods and other alignment methods may be used in the framework of the disclosure.

Merging the Two VDL Images into a High-resolution Image

When the first and second images have been aligned (e.g., generating the first aligned image 270 and the second aligned image 272), a high-resolution image (e.g., the merged image 274) using the two (or more) low-resolution images and the estimated global azimuth shift is reconstructed by merging generating the first aligned image 270 and the second aligned image 272. As used herein a "low-resolution image" is a representation of the original tool measurements that may be restricted by limitations in the tool's azimuthal and time resolution capabilities. In addition, as used herein, a "high-resolution image" has a greater resolution than the "low-resolution image", thereby providing a more detailed representation of the original tool measurements. A sparse matrix may be created in which is defined the new coordinate system with respect to desired scale factor and the pixels are mapped from the first low-resolution image first, respecting the scale-defined step, and then mapping the pixels from the second aligned low-resolution image using estimated shifts. At least in some instances, his may result in a certain number of missing pixels which are interpolated column-wise using any interpolation method. Merging two lower resolution samples may increase the resolution by at most twice without producing a noticeable portion of synthetic content.

In some embodiments, each of the aligned VDL images is a matrix having a certain number of pixels in view of azimuthal tool resolution. Merging the aligned VDL images may include creating a sparse matrix having a number of pixels that is at least twice the number of pixels of each of the aligned VDL images, mapping the pixels from each aligned VDL image into the sparse matrix based on the associated azimuth, and interpolating values of missing pixels from the mapped pixels. Additional details with respect to merging two VDL images is described below for FIG. 10.

Figure 10:
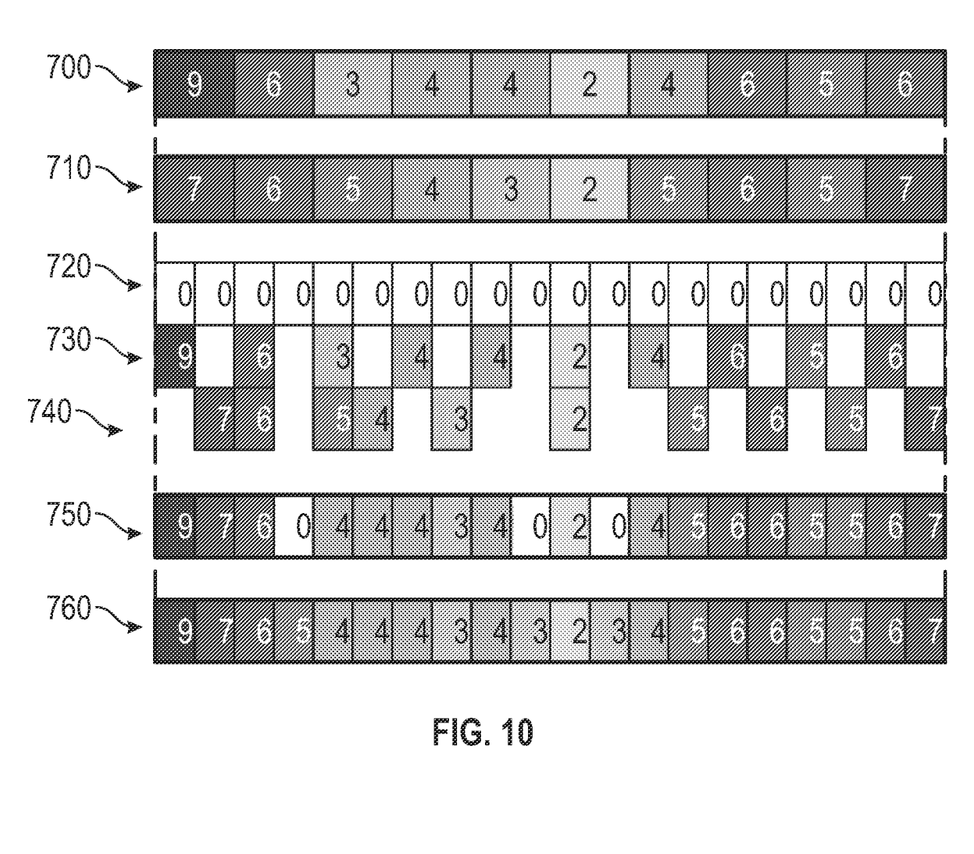
FIG. 10 is a diagram illustrating merging rows of pixels corresponding to different VDL images, in accordance with embodiments of the present disclosure.

FIG. 10 is a diagram illustrating merging rows of pixels corresponding to different VDL images, in accordance with embodiments of the present disclosure. As discussed above, the first and second images are each a two-dimensional (2D) matrix, wherein waveform intensities are depicted in time along a first dimension of the matrix, and in azimuths along a second dimension of the matrix.

For example, each row in the first VDL image comprises a number P of pixels. FIG. 10 depicts an example row 700 in the first VDL image, and an example row 710 second borehole VDL image, wherein each row 700, 710 comprises ten pixels (i.e., P=10), and each pixel comprises a numeric value of the measured parameter (e.g., waveform intensity) and is shaded corresponding to the numeric value. Merging the first and second images may be contemplated in terms of each row in the first and second images. For example, for each pixel in an array of N pixels, wherein N is greater than P, and wherein each of the N pixels corresponds to one of a plurality of azimuthal ranges that collectively span the row in the first VDL image, the merging may comprise setting a value of the measured parameter for that pixel equal to an average of values of the parameter measurements in the first and second VDL images that correspond to azimuthal locations within the azimuthal range corresponding to that pixel. Thus, continuing with the example shown in FIG. 10, an empty array 720 of twenty pixels (i.e., N=20) is depicted in vertical alignment with the azimuthally-corresponding pixels 730 of the first image row 700 and the azimuthally-corresponding pixels 740 of the second VDL image row 710, and row 750 depicts setting the pixel values equal to the average parameter measurements. For each pixel corresponding to an azimuthal range in which no parameter measurements in the first and second VDL images exist, the measured parameter value for that pixel is set to an interpolated value determined utilizing the value set for neighboring pixels, as depicted by row 760 in FIG. 10.

The set average values may be mean averages with no weighting or other discrimination between the first and second VDL images. However, the set average values may be weighted averages giving more influence to the first or second VDL image. Such weighting may be based on predetermined and/or user-defined values and/or on azimuthal position of the measurement point of each of the images. The number N may be at least twice as big as a maximum theoretical resolution M. M may be related to the resolution of the device that measures tool azimuth, such as M=360/azimuth resolution. For example, if the azimuth is precise to 10 degrees, then M=36.

Detecting an Object in the Borehole

Based on the high-resolution image having a better resolution, it is possible to detect an object in the borehole, even if it is not present at one of the measurement point in the tubing or outside of the tubing. This object will be detected by an experimented user or automatically, using well-known pattern of such object (for instance higher or lower intensity). The object may be detected inside the tubing, or in the annulus. It may be a control line as discussed above but may be any other relevant object. The ultrasonic measurement that is used may be a pulse-echo measurement or a flexural measurement. For example, the ultrasonic measurement may be a flexural measurement at the far receiver (e.g., a transducer for receiving as described herein, an ultrasonic receiver) of the ultrasonic tool.

FIG. 11 shows an axis that may be used to compute azimuthal offset, in accordance with embodiments of the present disclosure. In FIG. 11, the tool is represented as the origin of a system of coordinate and the tubing as the outer circle. The measurements being taken at a specific azimuthal resolution (e.g., 10°), the locations of measurements on the tubing are shown using squares and named $A_{Zi}$, i.e., $A_{Z1}, \ldots, A_{Z36}$ when there is a measurement every 10° and time distance from tool to tubing is designated $D_{AZi}$ respectively for each measurement point $A_{Zi}$. The original VDL image is represented so that the first column of the image corresponds to the waveform registered for ultrasonic measurement at $A_{Z1}$, the second at $A_{Z2}$ and the last one at $A_{Z36}$. In view of the above, the relative bearing (RB) prealignment comprises designating as the first column the azimuthal measurement that is the closest to the vertical direction (for instance $A_{Z35}$ on FIG. 11). This corresponds to subtracting the value of the relative bearing (i.e., 23° on FIG. 11) and to choose the measurement that is the closest to the reference angle (i.e., 337°) in that case. It corresponds to $A_{Z35}$ (at azimuth) 340°. Then the image is rotated so that the first column of the image corresponds to the waveform registered for ultrasonic measurement at $A_{Z35}$, the second at $A_{Z36}$ and the last one at $A_{Z34}$. The order of column may then optionally be reversed (i.e., the first column is $A_{Z35}$, the second is $A_{Z34}$ and the last one is $A_{Z36}$) depending on the chosen mathematical convention to represent the borehole wall (e.g., clockwise or anti-clockwise).

Figure 12:
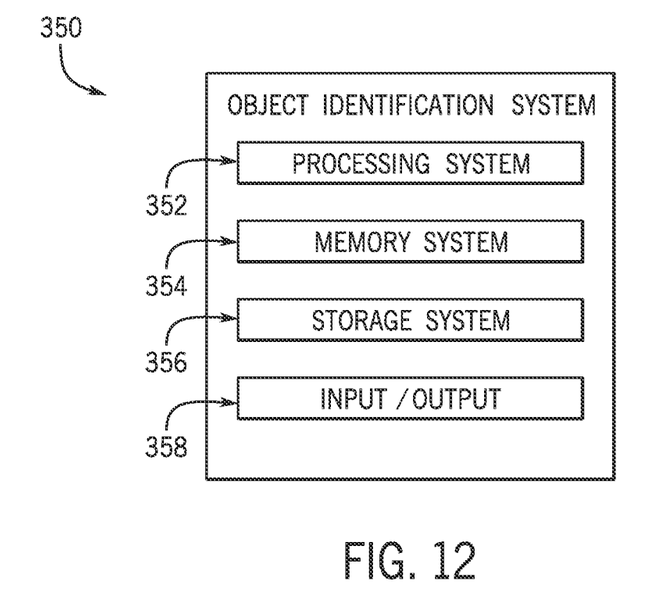
FIG. 12 shows an object identification system that may be used to perform certain operations described herein.

FIG. 12 shows an object identification system 350 that may be used to perform certain operations described herein. For example, the processing system 352 may perform or implement one or more blocks of the process 100 of FIG. 3, the process 150 of FIG. 5, the process 200 of FIG. 7, and/or the process 250 of FIG. 8. In some embodiments, the object identification system 350 may be implement as part of a personal computing device, an application on a tablet or smart phone, or other suitable user computing device. As shown, the object identification system 350 includes a processing system 352, a memory system 354, a storage system 356, an input/output (I/O) port 358, and the like.

The processing system 352 (e.g., processing circuitry) includes one or more processors that may be any type of computer processor or microprocessor capable of executing computer-executable code. In some embodiments, the processing system 352 include multiple processors that may perform the operations described below. The memory system 354 (e.g., memory circuitry) and the storage system 356 may be any suitable articles of manufacture that can serve as media to store processor-executable code, data, or the like. These articles of manufacture may represent computer-readable media (e.g., any suitable form of memory or storage) that may store the processor-executable code used by the one or more processors of the processing system 352 to perform the presently disclosed techniques. As used herein, applications may include any suitable computer software or program that may be installed onto the object identification system 350 and executed by the one or more processors of the processing system 352. The memory system 354 and the storage system 356 may represent non-transitory computer-readable media (e.g., any suitable form of memory or storage) that may store the processor-executable code used by the one or more processors of the processing system 352 to perform various techniques described herein. It should be noted that non-transitory merely indicates that the media is tangible and not a signal. The I/O ports 358 may be interfaces that may couple to other peripheral components such as input devices (e.g., keyboard, mouse), detectors, input/output (I/O) modules, and the like.

The specific embodiments described herein have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for detecting an object in a borehole, the method comprising:

acquiring, using a same ultrasonic logging tool at different passes or using multiple ultrasonic logging tools, at least two ultrasonic logs of a borehole section, wherein each of the ultrasonic logs comprises ultrasonic measurements taken (i) at one of the different passes or using one of the multiple ultrasonic logging tools, (ii) at a plurality of tool azimuths, and (iii) at a plurality of depths including a target depth, and wherein the ultrasonic measurements comprise at least one of: pulse-echo measurements or flexural measurements;

generating, at a processing system, a plurality of variable density log (VDL) images, wherein each of the plurality of VDL images maps ultrasonic waveform intensity as a function of the plurality of tool azimuths, and wherein each of the plurality of VDL images has a first resolution based on a sampling rate of the ultrasonic logging tool and a resolution of the plurality of tool azimuths;

aligning, at the processing system, the plurality of VDL images relative to time and tool azimuth;

merging, at the processing system, the aligned plurality of VDL images into a high-resolution VDL image having a second resolution higher than the first resolution, wherein merging the aligned plurality of VDL images comprises mapping a first number of pixels of each of the aligned plurality of VDL images to a second number of pixels, greater than the first number of pixels, wherein values of each of the second number of pixels correspond to average values of corresponding pixels of the aligned plurality of VDL images or to an interpolated value when there is no corresponding pixel of the aligned plurality of VDL images; and detecting, at the processing system, an object present in the borehole based on the high-resolution VDL image, wherein the object comprises at least one of: a tool, a downhole device, a control line, or a flatpack, wherein detecting the object is based on an ultrasonic waveform intensity pattern of the object, and wherein the ultrasonic waveform intensity pattern is a function of time, the plurality of tool azimuths, and the plurality of depths including the target depth.

2. The method of claim 1, wherein detecting the object comprises detecting the object in a casing of the borehole or in an annulus situated between the casing and a geological formation.

3. The method of claim 2, wherein the object is the control line situated in the annulus and the ultrasonic measurements are flexural measurements.

4. The method of claim 1, wherein the VDL image is a representation of all waveforms acquired at different azimuths of the target depth as a function of time and azimuth.

5. The method of claim 1, wherein each of the aligned VDL images is a matrix having the first number of pixels, wherein merging the aligned plurality of VDL images comprises creating a sparse matrix having the second number of pixels that is at least twice the first number of pixels.

6. The method of claim 1, wherein aligning the plurality of VDL images in azimuth comprises using an additional measurement relative to a tool orientation taken during the acquisition of the at least two ultrasonic logs.

7. The method of claim 6, wherein the additional measurement is a relative bearing measurement.

8. The method of claim 6, wherein aligning the plurality of VDL images in azimuth includes:
pre-aligning the plurality of VDL images using the relative bearing measurement;
computing a relative offset between the pre-aligned plurality of VDL images using a phase-cross-correlation method; and
using the relative offset to warp all of the pre-aligned plurality of VDL images into a coordinate system of a reference image.

9. The method of claim 1, wherein aligning the plurality of VDL images in time comprises aligning waveforms on a reference time corresponding to a common event.

10. The method of claim 9, wherein the common event is a reflection of an ultrasonic signal onto an inner surface of a casing.

11. The method of claim 1, wherein aligning the plurality of VDL images comprises, for each VDL image:
localizing tubing points measured using the ultrasonic measurements corresponding to the VDL image;
based on the tubing point localization, estimating a tubing center; and
converting the VDL image into a reference coordinate system defined based on the tubing center and on a vertical axis.

12. The method of claim 11, wherein each ultrasonic measurement records an ultrasonic waveform, and wherein localizing the tubing points comprises, for each recorded ultrasonic waveform:
detecting a first peak of the ultrasonic waveform; and
localizing an associated tubing point based on a position of the first peak.

13. The method of claim 12, wherein detecting the first peak comprises:
extracting an envelope of the recorded waveform using a transform; and
sampling up the extracted envelope using cubic interpolation.

14. The method of claim 11, wherein localizing the tubing points uses a relative bearing measured during acquisition of the at least two ultrasonic logs.

15. The method of claim 11, wherein the reference coordinate system comprises a center of tubing as an origin and the vertical axis as a reference axis.

16. A system for detecting an object in a borehole, the system comprising:
one or more ultrasonic logging tools configured to acquire, using a same ultrasonic logging tool at different passes or using multiple ultrasonic logging tools, at least two ultrasonic logs of a borehole section, wherein each of the ultrasonic logs comprises ultrasonic measurements taken (i) at one of the different passes or using one of the multiple ultrasonic logging tools, (ii) at a plurality of tool azimuths, and (iii) at a plurality of depths including a target depth, and wherein the ultrasonic measurements comprise at least one of: pulse-echo measurements or flexural measurements; and
a processing system configured to:
generate a plurality of variable density log (VDL) images, wherein each of the plurality of VDL images maps ultrasonic waveform intensity as a function of the plurality of tool azimuths, and wherein each of the plurality of VDL images has a first resolution based on a sampling rate of the ultrasonic logging tool and a resolution of the plurality of tool azimuths;
align the plurality of VDL images relative to time and tool azimuth;
merge the aligned plurality of VDL images into a high-resolution VDL image having a second resolution higher than the first resolution, wherein merging the aligned plurality of VDL images comprises mapping a first number of pixels of each of the aligned plurality of VDL images to a second number of pixels, greater than the first number of pixels, wherein values of each of the second number of pixels correspond to average values of corresponding pixels of the aligned plurality of VDL images or to an interpolated value when there is no corresponding pixel of the aligned plurality of VDL images; and
detect an object present in the borehole based on the high-resolution VDL image, wherein the object comprises at least one of: a tool, a downhole device, a control line, or a flatpack, wherein detecting the object is based on an ultrasonic waveform intensity pattern of the object, and wherein the ultrasonic waveform intensity pattern is a function of time, the plurality of tool azimuths, and the plurality of depths including the target depth.

17. The system of claim 16, wherein detecting the object comprises detecting the object in a casing of the borehole or in an annulus situated between the casing and a geological formation.

18. The system of claim 17, wherein the object is the control line situated in the annulus and the ultrasonic measurements are flexural measurements.

19. A non-transitory computer readable medium comprising computer executable code for detecting an object in a borehole, the computer executable code comprising:
code for acquiring, using a same ultrasonic logging tool at different passes or using multiple ultrasonic logging tools, at least two ultrasonic logs of a borehole section, wherein each of the ultrasonic logs comprises ultrasonic measurements taken (i) at one of the different passes or using one of the multiple ultrasonic logging tools, (ii) at a plurality of tool azimuths, and (iii) at a plurality of depths including a target depth, and wherein the ultrasonic measurements comprise at least one of: pulse-echo measurements or flexural measurements;

code for generating, at a processing system, a plurality of variable density log (VDL) images, wherein each of the plurality of VDL images maps ultrasonic waveform intensity as a function of the plurality of tool azimuths, and wherein each of the plurality of VDL images has a first resolution based on a sampling rate of the ultrasonic logging tool and a resolution of the plurality of tool azimuths;

code for aligning, at the processing system, the plurality of VDL images relative to time and tool azimuth;

code for merging, at the processing system, the aligned plurality of VDL images into a high-resolution VDL image having a second resolution higher than the first resolution, wherein merging the aligned plurality of VDL images comprises mapping a first number of pixels of each of the aligned plurality of VDL images to a second number of pixels, greater than the first number of pixels, wherein values of each of the second number of pixels correspond to average values of corresponding pixels of the aligned plurality of VDL images or to an interpolated value when there is no corresponding pixel of the aligned plurality of VDL images; and code for detecting, at the processing system, an object present in the borehole based on the high-resolution VDL image, wherein the object comprises at least one of: a tool, a downhole device, a control line, or a flatpack, wherein detecting the object is based on an ultrasonic waveform intensity pattern of the object, and wherein the ultrasonic waveform intensity pattern is a function of time, the plurality of tool azimuths, and the plurality of depths including the target depth.

20. The non-transitory computer readable medium of claim 19, wherein the code for detecting the object comprises code for detecting the object in a casing of the borehole or in an annulus situated between the casing and a geological formation.

* * * * *